Patented Jan. 1, 1929.

1,697,265

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF OXIDIZING PETROLEUM.

No Drawing.   Application filed April 3, 1923. Serial No. 629,711.

This invention relates to the oxidation of petroleum hydrocarbons and their derivatives and relates particularly to the oxidation of cracked petroleum oil or oil vapors in a cracked state; the oxidation being carried out preferably in the presence of a catalyst and preferably by means of air or an oxygen-containing gas as the oxidizing agent.

The present invention is concerned especially with oxidation of the petroleum material within a certain range of temperature by means of which especially useful products are obtained. The proposal already has been made to oxidize petroleum oil vapors in the presence of a catalyst at elevated temperatures but not exceeding a black heat. Petroleum also has been oxidized at a decided red heat. In the present invention it is an object to carry out the oxidation of the petroleum material at a temperature in the neighborhood of incipient redness, namely that temperature range just above that of a black heat and below a decided red heat. Working under these conditions notable yields of certain valuable products are obtained.

At elevated temperatures but still within the black heat range a mixture of aldehydic and acid bodies are obtained along with the usual products of combustion; the acid bodies generally preponderating. At a strong red heat the products obtained are mainly the usual gaseous products of combustion such as carbon dioxide, carbon monoxide and water. At the temperature employed in the present invention valuable aldehydic bodies may be obtained almost exclusively under appropriate conditions of operation.

The nature of the catalyst employed to some extent also controls the character and quality of the products obtained when working at a temperature of incipient redness. At this temperature it is preferable to employ a relatively mild oxidizing catalyst as otherwise there may be a tendency for the catalyst to become heated above this point resulting in the overwhelming production of permanent gases as oxidation products and consequent lowering of the yield of intermediate products desired. However when using a stronger oxidation catalyst the introduction of a suitable diluent such as steam, nitrogen and the like into the mixture of petroleum vapors and the oxidizing agent will serve to prevent a spontaneous rise in temperature of the catalytic body to an extent sufficient in many cases to prevent the production of undesirable bodies. In the present invention therefore while preferably using a mild catalytic agent such as silver and aluminum (in some cases copper) for the oxidation of petroleum oils and their cracked products the use of stronger oxidizing catalysts such as vanadium, platinum, chromium and their compounds may be employed preferably in the presence of a diluent gas. Carbon dioxide, carbon monoxide and products of combustion may be used for diluting purposes in lieu of steam or nitrogen.

One method of carrying out the present invention is to first crack petroleum oil such as crude petroleum oil, kerosene, gasoline etc. and mix it with oxygen or an oxygen-containing gas such as air, carbon dioxide, steam and the like and passing the resulting mixture over a suitable catalyst which is maintained at a temperature of incipient redness by any suitable means. As an example of the preferred form in which the present invention may be carried out a petroleum distillate such as kerosene is passed into a cracking furnace which is maintained at any desired cracking temperature such as temperatures ranging from 1000–1400° F., then mixing the cracked oil vapors with air by means of a Venturi tube and passing the resulting mixture over a catalyst such as vanadium, silver, copper etc. or the oxides of these metals supported on a carrier such as granulated pumice, asbestos or the like which is maintained at a temperature of incipient redness, namely, 910–960° F., cooling the vapors and gases issuing from the catalyst as quickly as possible, condensing the higher boiling compounds present in the treated gas stream by means of a water cooled condenser or the like and removing the lighter or lower boiling constituents by means of scrubbing towers filled with suitable scrubbing agents such as water, alcohol, petroleum oil and the like.

One method of carrying out the present invention is as follows: Kerosene is allowed to drip through a cracking furnace maintained at a temperature of 1000–1400° F. and mixed with 5.7 parts by weight of air to 1 part of hydrocarbon and passed over a catalyst consisting of vanadium oxide (using pumice as a carrier for the catalyst) and which was maintained at a temperature in the neighborhood of 970°–1000° F. The products of the catalytic treatment were immediately cooled and the constituents of higher boiling point condensed by means of a water cooled condenser and the liquid products resulting from this treatment collected in a suitable container. The residual gases were passed into a series of scrubbing towers, the first two of which contained water and the third alcohol and the last one heavy petroleum oil. Operating under the above described conditions a mixture of aldehydes and acid were obtained, the aldehydic bodies predominating. The aldehydic bodies recovered amounted to 1.25 per cent of the weight of the oil passed into the cracking furnace, the acid bodies present in the product amounting to .42 per cent. The principal aldehyde found in the product was formaldehyde, along with a small quantity of acetaldehyde, benzaldehyde and acrolein. While the acid bodies consisted of maleic, phthalic, citraconic, benzoic, propionic and formic acids.

Introducing steam into the mixture of gases and vapors before passing them over the catalyst materially increased the yield of aldehydic bodies obtained. For example when running under the conditions as outlined in the foregoing example by mixing 10 parts by weight of water in the form of steam with 1 part by weight of the mixed gases (cracked petroleum oil and air), the yield of aldehydic bodies obtained was 15.2 per cent of the oil passed into the cracking chamber while the acid bodies recovered amounted to but .25 per cent of the oil passed.

Another illustration of the manner in which the present invention may be carried out using a comparatively mild oxidizing catalytic agent is as follows: Kerosene oil and water is passed into a cracking furnace maintained at a temperature of 1250–1300° F. The resulting vapors of steam and petroleum oil products are mixed with 10 parts by weight of air to 1 part of hydrocarbon by means of a Venturi tube and passed over a catalyst consisting of silver and silver oxide on pumice which was maintained at a temperature below 1000° F. but at incipient redness. The gases issuing from the catalytic chamber were condensed and scrubbed as noted in the foregoing illustrations. The aldehydic bodies recovered amounted to .22 per cent of the oil passed into the cracking chamber while the acid bodies recovered amounted to but .25 per cent. The aldehydic bodies found in the condensate consisted principally of formaldehyde mixed with a small quantity of acetaldehyde, benzaldehyde etc. The acid bodies recovered were a mixture of maleic and phthalic acids.

Kerosene is mentioned in the above examples in an illustrative manner and it is to be understood that any petroleum oil or product of petroleum oil is equally suited for carrying out the process. Furthermore the invention is not limited to the catalysts mentioned in the above examples as any of the oxidizing catalysts such as copper, thorium, aluminum, platinum, vanadium etc. may be used. Also the invention is not limited to the use of air as the oxidizing agent as any oxygen-containing gas or oxygen diluted with any suitable diluent may be employed.

As an illustration of the invention when an oxygen-containing gas is used as the oxidizing agent cracked petroleum oil vapors mixed with 3 parts by weight of carbon dioxide to 1 part of hydrocarbon were passed over a catalyst consisting of vanadium oxide on pumice maintained at a temperature below 1000° F. but above a black heat so that the temperature was within the range of incipient redness. The aldehydic bodies recovered amounted to 1.02 per cent of the kerosene oil passed into the cracking chamber while the acid bodies recovered amounted to .11 per cent of the oil passed. The nature of the aldehydic and acid bodies obtained were similar to those obtained by using air as the oxidizing agent principally formaldehyde and maleic acid.

It can be readily seen from the foregoing illustrative examples that aldehydes or aldehydic bodies are principally formed by means of catalytic oxidation at a temperature of incipient redness and while the introduction of steam or of a diluent plays an important part in obtaining satisfactory yields of the aldehydic material the presence of steam merely serves to prevent the spontaneous rise in the temperature of the catalytic body to a point where gaseous products of combustion only are obtained and may therefore be considered as a diluent of the gaseous mixture and it does not in itself enter into the reaction other than possibly having a slight catalytic effect.

Expressed in degrees Fahrenheit the range of temperature employed in accordance with the present invention may be set broadly (that is with wide limits) at from 840° F. (450° C.) to about 1000° F. (538° C.). Preferably however the temperature is kept within narrower limits e. g. 910° F. (488° C.) to 970° F. (521° C.). Expresed in another way a broad range of temperature is that below 1000° F. (538° C.) but above a black heat.

What I claim is:—

1. The process of oxidation which consists in subjecting in the vapor state derivatives of petroleum hydrocarbons obtained by cracking to the action of oxygen in the presence of a catalyst at a temperature of incipient redness whereby intermediate products of oxidation other than ordinary products of combustion are obtained.

2. The process of oxidation which consists in subjecting in the vapor state derivatives of petroleum hydrocarbons obtained by cracking to the action of oxygen and a diluent in the presence of a catalyst at a temperature of incipent redness whereby aldehydic products of oxidation are obtained.

3. The process of oxidation which consists in subjecting in the vapor state derivatives of petroleum hydrocarbons obtained by cracking to the action of oxygen in the presence of a catalyst at a temperature of incipient redness, the amount of oxygen being sufficient for only partial combustion whereby aldehydic products of oxidation are obtained in predominating amount.

4. The oxidation process which comprises subjecting in the vapor state derivatives of petroleum hydrocarbons obtained by cracking and containing unsaturated and aromatic hydrocarbons to the action of oxygen in a diluted condition in the presence of a catalyst to a temperature of incipient redness, the amount of oxygen being sufficient for only partial combustion whereby intermediate products of oxidation other than ordinary products of combustion are obtained.

5. The oxidation process which comprises subjecting in the vapor state derivatives of petroleum hydrocarbons obtained by cracking to the action of oxygen in a diluted condition in the presence of a catalyst to a temperature of incipient redness, the amount of oxygen being sufficient for only partial combustion whereby intermediate products of oxidation other than ordinary products of combustion are obtained.

6. The oxidation process which comprises subjecting in the vapor state a mixture of air and derivatives of petroleum hydrocarbons obtained by cracking in the presence of a catalyst to a temperature of incipient redness, the amount of oxygen being sufficient for only partial combustion whereby intermediate products of oxidation other than ordinary products of combustion are obtained.

7. The process of oxidizing cracked petroleum hydrocarbons which comprises subjecting in the vapor state the cracked material to the action of an oxygen-containing gas at a temperature of incipient redness, the amount of oxygen being sufficient only to accomplish partial combustion and form intermediate products of oxidation other than ordinary products of combustion.

8. The process of oxidizing cracked petroleum hydrocarbons which comprises subjecting in the vapor state the cracked material to the action of air at a temperature of approximately incipient redness, the amount of oxygen being sufficient only to accomplish partial combustion and form intermediate products of oxidation other than ordinary products of combustion.

9. The process of oxidizing cracked petroleum hydrocarbons which comprises subjecting in the vapor state the cracked material to the action of an oxygen-containing gas at a temperature of approximately incipient redness, the amount of oxygen being sufficient only to accomplish partial combustion and form aldehydic products in notable amount.

CARLETON ELLIS.